US011188731B2

(12) United States Patent
Dai et al.

(10) Patent No.: US 11,188,731 B2
(45) Date of Patent: Nov. 30, 2021

(54) FEATURE DATA PROCESSING METHOD AND DEVICE

(71) Applicant: ALIBABA GROUP HOLDING LIMITED, Grand Cayman (KY)

(72) Inventors: Bin Dai, Hangzhou (CN); Shen Li, Hangzhou (CN); Xiaoyan Jiang, Hangzhou (CN); Xu Yang, Hangzhou (CN); Yuan Qi, Hangzhou (CN); Wei Chu, Hangzhou (CN); Shaomeng Wang, Hangzhou (CN); Zihao Fu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 193 days.

(21) Appl. No.: 16/038,780

(22) Filed: Jul. 18, 2018

(65) Prior Publication Data

US 2018/0341801 A1    Nov. 29, 2018

Related U.S. Application Data

(63) Continuation of application No. PCT/CN2017/070621, filed on Jan. 9, 2017.

(30) Foreign Application Priority Data

Jan. 18, 2016    (CN) .......................... 201610031819.3

(51) Int. Cl.
*G06K 9/00* (2006.01)
*G06K 9/62* (2006.01)
*G06N 20/00* (2019.01)
*G06F 17/18* (2006.01)

(52) U.S. Cl.
CPC ......... *G06K 9/00067* (2013.01); *G06F 17/18* (2013.01); *G06K 9/623* (2013.01);
(Continued)

(58) Field of Classification Search
CPC .................................................. G06K 9/00067
(Continued)

(56) References Cited

U.S. PATENT DOCUMENTS

2006/0069678 A1    3/2006  Chou et al.
2006/0104484 A1*   5/2006  Bolle ................. G06K 9/00073
                                                 382/115

(Continued)

FOREIGN PATENT DOCUMENTS

CN    103324610 A    9/2013
CN    103679160 A    3/2014
(Continued)

OTHER PUBLICATIONS

PCT International Search Report and Written Opinion dated Apr. 7, 2017, issued in corresponding International Application No. PCT/CN2017/070621 (12 pages).

(Continued)

*Primary Examiner* — Stephen P Coleman
(74) *Attorney, Agent, or Firm* — Finnegan, Henderson, Farabow, Garrett & Dunner, LLP

(57) ABSTRACT

The present disclosure provides feature data processing methods and devices. One exemplary feature data processing method comprises: classifying features into an important feature set and an auxiliary feature set according to information attribute values of the features; converting features in the auxiliary feature set to hash features; and combining the hash features with features in the important feature set, and setting the combined features as fingerprint features. Training and prediction of to-be-processed data can be performed based on the fingerprint features. With the embodiments of the present disclosure, training dimensions can be more (Continued)

controllable and the amount training data amount can be reduced. Therefore, the efficiency of data processing can be improved.

18 Claims, 6 Drawing Sheets

(52) U.S. Cl.
CPC ......... *G06K 9/6217* (2013.01); *G06K 9/6261* (2013.01); *G06K 9/6267* (2013.01); *G06N 20/00* (2019.01)

(58) Field of Classification Search
USPC ........................................................ 382/100
See application file for complete search history.

(56) References Cited

U.S. PATENT DOCUMENTS

2009/0087016 A1* 4/2009 Berestov .......... H04N 21/44008
382/100
2013/0067238 A1* 3/2013 Homme .................. G06F 21/51
713/189
2015/0063688 A1* 3/2015 Bhardwaj ............ G06K 9/3258
382/159
2015/0168538 A1* 6/2015 Bradley ................ G01S 5/0257
367/127
2017/0011252 A1* 1/2017 Yang ....................... G06F 3/011

FOREIGN PATENT DOCUMENTS

| CN | 104298791 A | 1/2015 |
| CN | 104636493 A | 5/2015 |
| WO | WO 2017/124930 A1 | 7/2017 |

OTHER PUBLICATIONS

First Office Action issued by The State Intellectual Property Office of People's Republic of China in corresponding Chinese Application No. 201610031819.3; dated Mar. 3, 2019 (7 pgs.)

* cited by examiner

Algorithm 3 SimuParallelSGD(Examples $\{c^1, \ldots c^m\}$, Learning Rate $\eta$, Machines $k$)

Define $T = \lfloor m/k \rfloor$
Randomly partition the examples, giving $T$ examples to each machine.
for all $i \in \{1, \ldots, k\}$ parallel do
    Randomly shuffle the data on machine $i$.
    Initialize $w_{i,0} = 0$.
    for all $t \in \{1, \ldots, T\}$: do
        Get the $t$th example on the $i$th machine (this machine), $c^{i,t}$
        $w_{i,t} \leftarrow w_{i,t-1} - \eta \partial_w c^i(w_{i,t-1})$
    end for
end for
Aggregate from all computers $v = \frac{1}{k} \sum_{i=1}^{k} w_{i,t}$ and return $v$.

Data table browsing

Table  Data processing  Full table description  Statistics  Analyze  Model Tool  Draw

| | col | tp | tn | tp | tn | total_pos | total_neg | IV | IG |
|---|---|---|---|---|---|---|---|---|---|
| 0 | 1 | 5621 | 1932208 | 7229205 | 1210326215 | 7234826 | 1212258423 | 5.87711... | 2.20613... |
| 1 | 10 | 184290 | 34452733 | 7060636 | 1177805690 | 7234826 | 1212258423 | 3.31695... | 1.33531... |
| 2 | 1000 | 1567 | 931313 | 7233259 | 1211277105 | 7234826 | 1212258423 | 7.82036... | 2.52107... |
| 3 | 100000 | 10 | 2068 | 7234816 | 1212255355 | 7234826 | 1212258423 | 6.81132... | 2.79715... |
| 4 | 100002 | 1 | 771 | 7234825 | 1212257652 | 7234826 | 1212258423 | 7.59792... | 2.44439... |
| 5 | 100004 | 3 | 850 | 7234823 | 1212257573 | 7234826 | 1212258423 | 1.50500... | 5.34963... |
| 6 | 100005 | 9 | 1230 | 7234817 | 1212257193 | 7234826 | 1212258423 | 4.67386... | 2.05491... |
| 7 | 100003 | 2 | 852 | 7234824 | 1212257571 | 7234826 | 1212258423 | 3.97857... | 1.43503... |
| 8 | 100011 | 4 | 1053 | 7234822 | 1212257370 | 7234826 | 1212258423 | 1.42644... | 5.81722... |
| 9 | 100013 | 5 | 844 | 7234821 | 1212257579 | 7234826 | 1212258423 | 3.77851... | 1.80399... |
| 10 | 100015 | 22 | 3446 | 7234804 | 1212254977 | 7234826 | 1212258423 | 1.33614... | 5.74715... |
| 11 | 100017 | 2 | 540 | 7234824 | 1212257383 | 7234826 | 1212258423 | 8.06321... | 3.15101... |
| 12 | 100019 | 1 | 620 | 7234825 | 1212257303 | 7234826 | 1212258423 | 4.88318... | 1.53952... |
| 13 | 100020 | 83 | 15259 | 7234743 | 1212243164 | 7234826 | 1212258423 | 1.03414... | 4.33213... |
| 14 | 100022 | 22 | 1829 | 7234804 | 212256594 | 7234826 | 1212258423 | 1.07377... | 5.03320... |
| 15 | 100024 | 6 | 1295 | 7234820 | 1212257128 | 7234826 | 1212258423 | 6.04910... | 2.45502... |
| 16 | 100026 | 7 | 3199 | 7234819 | 1212255224 | 7234826 | 1212258423 | 1.67693... | 5.96912... |
| 17 | 100028 | 52 | 2315 | 7234774 | 1212255108 | 7234826 | 1212258423 | 6.99528... | 3.59951... |
| 18 | 100031 | 20 | 1225 | 7234806 | 1212257198 | 7234826 | 1212258423 | 1.76507... | 3.72257... |
| 19 | 100033 | 7 | 1170 | 7234819 | 1212257253 | 7234826 | 1212258423 | 5.96822... | 2.53324... |
| 20 | 100035 | 1 | 471 | 7234825 | 1212257952 | 7234826 | 1212258423 | 2.58702... | 9.15522... |
| 21 | 100037 | 380 | 52975 | 7234446 | 1212205448 | 7234826 | 1212258423 | 1.62312... | 7.11376... |
| 22 | 100039 | 3 | 568 | 7234823 | 1212257355 | 7234826 | 1212258423 | 6.68352... | 2.74132... |
| 23 | 100040 | 14 | 3000 | 7234812 | 1212255423 | 7234826 | 1212258423 | 1.32737... | 5.41798... |
| 24 | 100042 | 93 | 14509 | 7234733 | 1212243314 | 7234826 | 1212258423 | 5.18543... | 2.22937... |
| 25 | 100044 | 9 | 839 | 7234817 | 1212257584 | 7234826 | 1212258423 | 3.23597... | 1.50324... |
| 26 | 100046 | 29 | 3880 | 7234797 | 1212254543 | 7234826 | 1212258423 | 1.81776... | 3.01392... |

Whole Table ▶  Position Data size – Row, Currently display first 50 rows (10000 rows at most)  GO!

FIG. 3

Algorithm 1 The $b$-bit minwise hashing algorithm, applied to estimating pairwise resemblances in a collection of $N$ sets.

Input: Sets $S_n \in \Omega = \{0, 1, ..., D-1\}, n = 1$ to $N$.

Pre-processing:

1): Generate $k$ random permutations $\pi_j : \Omega \to \Omega, j = 1$ to $k$.
2): For each set $S_n$ and each permutation $\pi_j$, store the lowest $b$ bits of $\min(\pi_j(S_n))$, denoted by $e_{n,i,j}, i = 1$ to $b$.

Estimation: (Use two sets $S_1$ and $S_2$ as an example.)

1): Compute $\hat{E}_b = \frac{1}{k} \sum_{j=1}^{k} \left\{ \prod_{i=1}^{b} 1\{e_{1,i,\pi_j} = e_{2,i,\pi_j}\} = 1 \right\}$.
2): Estimate the resemblance by $\hat{R}_b = \frac{\hat{E}_b - C_{1,b}}{1 - C_{2,b}}$, where $C_{1,b}$ and $C_{2,b}$ are from Theorem 1 in Sec. 2.

FIG. 4

FEATURE DATA PROCESSING METHOD AND DEVICE

This application claims priority to International Application No. PCT/CN2017/070621, filed on Jan. 9, 2017, which claims priority to and the benefits of priority to Chinese Application No. 201610031819.3, filed on Jan. 18, 2016, both of which are incorporated herein by reference in their entireties.

TECHNICAL FIELD

The present disclosure generally relates to the technical field of internet technologies, and in particular, to feature data processing methods and devices.

BACKGROUND

With the continuous development of the internet, data generated by a large number of users while using the internet can be converted into useful information and knowledge. These acquired information and knowledge can be widely used in various applications, including business management, production control, market analysis, engineering design, scientific exploration, and the like. Accordingly, data mining technologies have drawn increasing attention from the information industries. Data mining generally refers to the process of searching for hidden information from a large amount of data by using certain algorithms. Data mining generally relates to the field of computer science. With statistic tools, online analysis and processing, information retrieval, machine learning, expert system (based on past experiences), mode recognition, and many other methods, data mining can be used in various applications and for various purposes.

In a data mining service scenario, classification or regressive calculation often needs to be performed on super-large-scale data using machine learning algorithms. In the current internet environment, training can involve billions of or even hundreds of billions of pieces of data. Training features can be of an enormous magnitude as services expand. Taking a click-through-rate (CTR) service as an example, the amount of features involved in the calculation can be tens of billions. Existing techniques address such problems by parallel calculation. For example, super-large-scale calculation clusters may be involved for a scale of tens of billions of features*hundreds of billions of pieces of data. The processing can take an extremely long time to obtain a final optimal result, and it can hardly meet the requirements of service updates.

FIG. 1 illustrates a schematic diagram of pseudo-codes implementation 100 for processing feature data according to some existing techniques. As shown in FIG. 1, T pieces of data are allocated to each worker (processing device). Optimization and updating are performed by using the data. The results can be reduced by a designated processing terminal. However, such a solution is essentially distributing original massive data to N different workers for calculation. The total volume of data processed and features used for data processing remain the same. The volume of data processed by each worker is 1/N of the total data volume. Such methods can be used to process data within a certain volume range. However, when there are hundreds of billions of samples and tens of billions of features, the total data volume may exceed the petabyte level and exceed the calculation capacity of ordinary calculation clusters. Therefore, the processing may take a long time, and the efficiency is low.

In light of the above, when massive data needs to be processed, there is a need to reduce feature dimensions while keeping feature information, so as to reduce the amount of training data and to improve the efficiency of data calculation processing.

SUMMARY

The present disclosure provides feature data processing methods and devices. According to some embodiments, by introducing information value selection and hashing, a feature fingerprint of each sample can be generated to replace an original feature for training, thus keeping information of the features to the maximum extent while reducing feature dimensions. Further, controllability of training dimensions is improved, the training data amount is reduced, and the training speed can be faster.

According to some embodiments, methods for feature data processing are provided. One exemplary method includes: classifying current existing features into an important feature set and an auxiliary feature set according to respective information attribute values of the features; converting the features in the auxiliary feature set to hash features; and combining the hash features with the features in the important feature set, and setting the combined features as fingerprint features.

In some embodiments, the information attribute value can include at least one of information value and information gain of the feature. The process of classifying current existing features into an important feature set and an auxiliary feature set according to information attribute values of the features can include: acquiring information attribute values of the features; setting features having the information attribute values greater than or equal to a preset threshold as important features, and setting features having the information attribute values less than the threshold as auxiliary features; and generating the important feature set according to the important features among the features, and generating the auxiliary feature set according to the auxiliary features among the features.

In some embodiments, converting the features in the auxiliary feature set to hash features can include converting, according to a preset hash algorithm, the auxiliary features to vectors including parameters corresponding to the hash algorithm.

In some embodiments, after setting the combined features as fingerprint features, the method can further include: replacing original features corresponding to to-be-processed data with the fingerprint features; and preform training and prediction on the to-be-processed data according to the fingerprint features.

According to some embodiments of the present disclosure, feature data processing devices are provided. One exemplary feature data processing device includes: a classification module configured to classify current existing features into an important feature set and an auxiliary feature set according to information attribute values of the features; a conversion module configured to convert the features in the auxiliary feature set to hash features; and a combination module configured to combine the hash features with the features in the important feature set, and set the combined features as fingerprint features.

In some embodiments, the information attribute value can include an at least one of information value and information gain of the feature, and the classification module can further include: an acquisition sub-module configured to acquire information attribute values of the features; a setting sub-module configured to set features having the information attribute values greater than or equal to a preset threshold as important features, and set features having the information attribute values less than the threshold as auxiliary features; and a generation sub-module configured to generate the important feature set according to the important features among the features, and generate the auxiliary feature set according to the auxiliary features among the features.

In some embodiments, the procedures of converting the features in the auxiliary feature set to hash features by the conversion module can include: converting, according to a preset hash algorithm, the auxiliary features to vectors including parameters corresponding to the hash algorithm.

In some embodiments, the combination module can further include: a replacement sub-module configured to replace original features corresponding to to-be-processed data with the fingerprint features; and a training sub-module configured to perform training and prediction on to-be-processed data according to the fingerprint features.

BRIEF DESCRIPTION OF THE DRAWINGS

In order to explain technical solutions of the present disclosure more clearly, a brief introduction of the accompanying drawings to be used for describing the embodiments is provided below. Apparently, the drawings described below relates to merely some exemplary embodiments of the present disclosure. Other drawings can be obtained according to these drawings by those skilled in the art consistent with the present disclosure.

FIG. 1 is a schematic diagram of an exemplary pseudo-codes implementation for feature training.

FIG. 3 is a schematic diagram of an exemplary output form of information value calculation according to some embodiments of the present disclosure.

FIG. 4 is a schematic diagram of an exemplary Hashing algorithm according to some embodiments of the present disclosure.

DETAILED DESCRIPTION

To further illustrate the technical solutions provided in the present disclosure, examples of the technical solutions are described below with reference to some application scenarios and the accompanying drawings. Apparently, the described embodiments are merely exemplary, and do not represent all the embodiments of the present disclosure. Based on the embodiments described herein, other embodiments can be obtained consistent with the present disclosure, which shall all fall within the protection scope of the present disclosure.

With the embodiments of the present disclosure, original features can be classified into important features and auxiliary features. The important features can be kept unchanged. The auxiliary features can be processed using a hashing method to obtain hash values. An important feature set can be combined with the hash values to obtain original feature fingerprints, which can be used to facilitate cluster learning, training, and prediction. That way, feature dimensions can be reduced while keeping the feature information. Embodiments of the present disclosure can help reduce the amount of training data and improve efficiency of data calculation, thus improving the efficiency of data processing.

Figure 2:
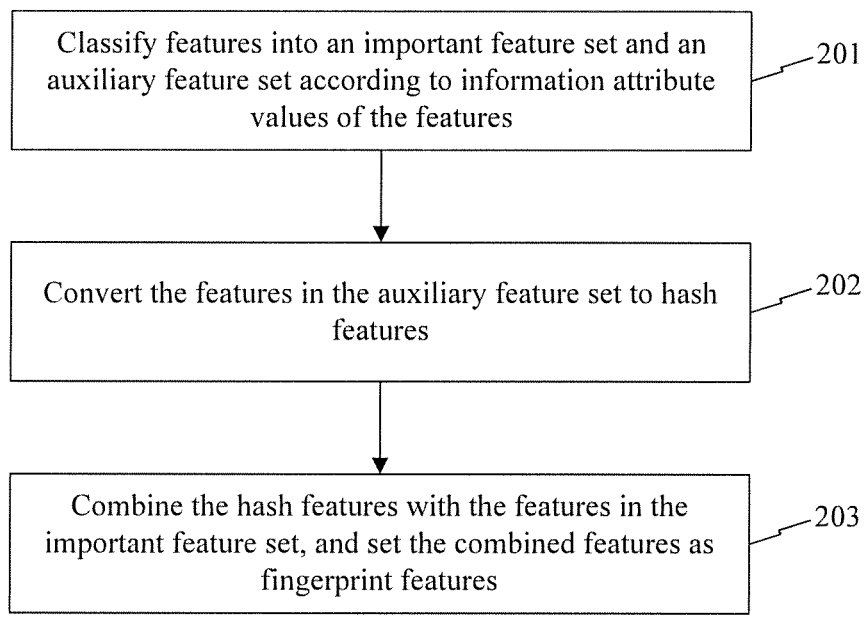
FIG. 2 is a schematic flowchart of an exemplary feature data processing method according to some embodiments of the present disclosure.

FIG. 2 shows an exemplary feature data processing method according to some embodiments of the present disclosure. As shown in FIG. 2, the exemplary method 200 can include the following procedures.

In step 201, data features can be classified into an important feature set and an auxiliary feature set according to information attribute values of the features. To simplify data features, original features of data can be classified into two feature sets: an important feature set and an auxiliary feature set. The features in the important feature set can all be kept unchanged. The features in the auxiliary feature set generally have high dimensions and can be processed subsequently to reduce the dimensions.

With an increasing number of data interfaces, there may be more and more original variables and derived variables of data sets. Therefore, information value is may be important in actual data applications. The informational value can represent the amount of "information" of each variable with respect to a target variable, and can be used to simplify the feature selection process.

Feature selection is usually performed after the importance of the features is quantified. How to quantify the features can be the biggest difference among various methods. With respect to information gain, a measurement criterion of importance is the amount of information that a feature contributes to a classification system. The more information the feature contributes to the classification system, the more important the feature is. Therefore, for a feature, information gain indicates a difference between the amount of information in the system with the presence of the feature and the amount of information in the system in the absence of the feature. The difference between the two amounts is the amount of information that the feature contributes to the system, namely, information gain of the feature.

Information value and information gain are two attributes closely related to the feature. In some embodiments of the present disclosure, the information attribute value can include the information value and the information gain of the feature. A feature attribute value of each piece of feature data can be calculated, so as to acquire information attribute values of the features.

Taking the binary approach as an example, a formula for calculating an information attribute value in some embodiments of the present disclosure can be as follows:

$$WoE = \ln(pctlGood/pctlbad)$$

$$MIV = WoE * (pctlGood - pctlbad)$$

$$IV = \Sigma MIV$$

A corresponding output form 300 can be as shown in FIG. 3, where the col column represents feature name, tp represents true positive, to represents true negative, IV represents information value, and IG represents information gain.

In some embodiments, an information value threshold and/or information gain threshold can be preset to classify features as important features or auxiliary features. The information attribute values of the features obtained by calculation based on the foregoing formula can be compared with the preset information value threshold and/or information gain threshold. If the information attribute value of a feature is greater than or equal to the preset threshold, the feature can be determined as an important feature. If the information attribute value of a feature is less than the threshold, the feature can be determined as an auxiliary feature.

Based on the important features and the auxiliary features determined in the foregoing, the original features can be classified into two parts: the important feature set and the auxiliary feature set, based on values associated with the information value and/or information gain. The information attribute values of the features in the important feature set are all greater than or equal to the preset threshold, and the information attribute values of the features in the auxiliary feature set are less than the preset threshold.

In the foregoing example, information value and information gain are used as an example in the classification of features into the important feature set and the auxiliary feature set. It is appreciated that other attributes or measures can be used in other embodiments, which shall all belong to the protection scope of the present disclosure.

In step 202, features in the auxiliary feature set can be converted to hash features. As described above in step 201, the auxiliary feature set may be large. In some embodiments of the present disclosure, the auxiliary feature set can be converted into hash value identifiers by using a b-bit minwise hashing algorithm. An example of a preset hash algorithm can be algorithm 400 as shown in FIG. 4.

By using the foregoing algorithm, the auxiliary features in the auxiliary feature set can be converted to a k*2b-dimensional vector, wherein k and b are algorithm designated parameters. In some embodiments of the present disclosure, the auxiliary feature set can be processed by using the b-bit minwise hashing algorithm. The b-bit minwise hashing algorithm is widely applied in information retrieval with respect to massive data. The b-bit minwise hashing algorithm was mainly proposed for reducing memory space and improving calculation speed. The precision may decrease as b decreases. By processing the auxiliary feature set using the b-bit minwise hashing, b=64 bits can be reduced to b bits, thus reducing the storage space and calculation time.

It is appreciated that in some embodiments, the process only converts the auxiliary features in the auxiliary feature set to hash value identifiers. The features in the important feature set are not processed. The features in the important feature set can be all kept unchanged.

In step 203, the hash features can be combined with the features in the important feature set, and the combined features can be set as fingerprint features. In some embodiments, the features in the important feature set can be combined with the hash values converted from the auxiliary features, and the combined features can be set as fingerprint features. Original features corresponding to to-be-processed data can be replaced with the fingerprint features, and the to-be-processed data can be trained and predicted based on the fingerprint features.

Figure 5:
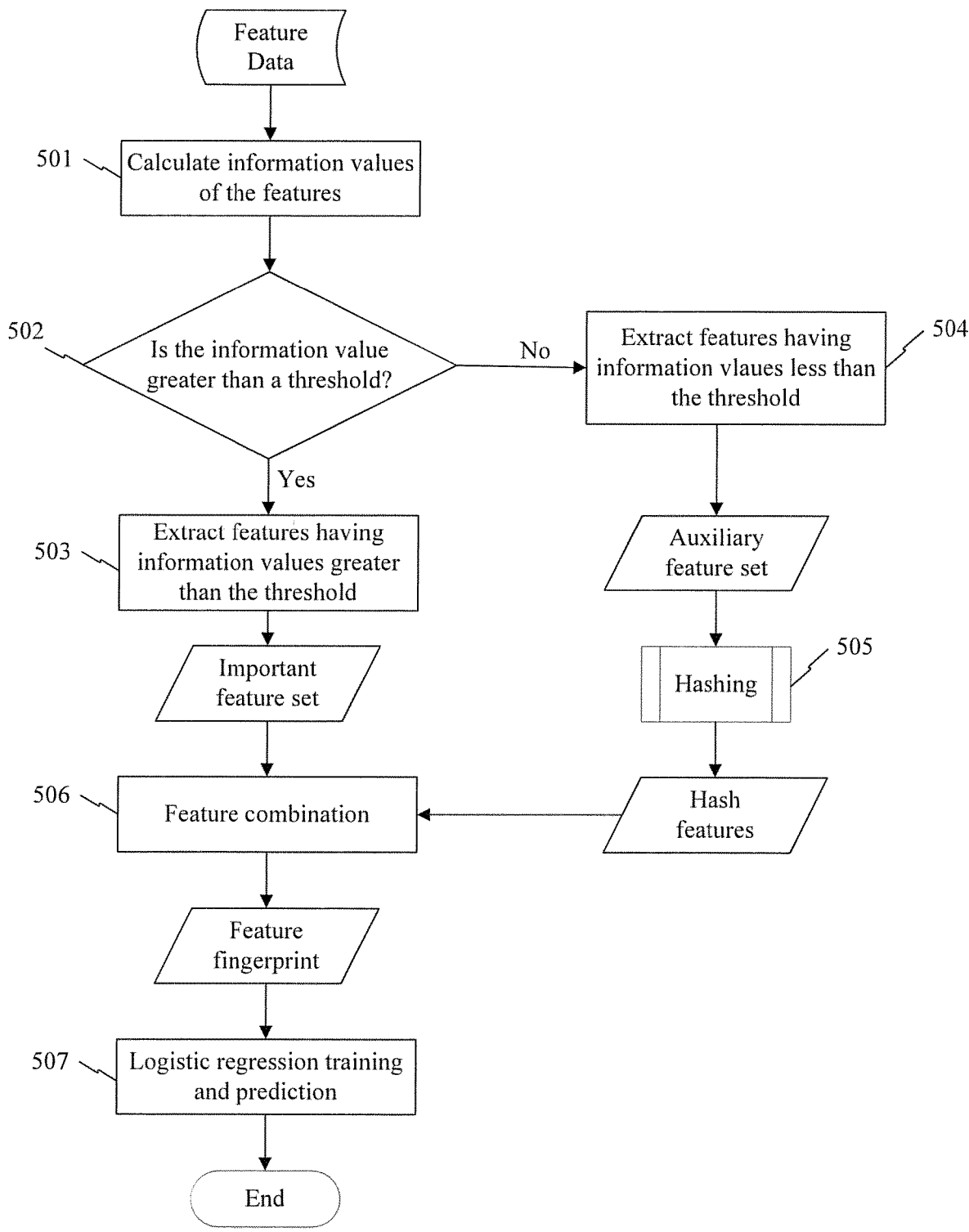
FIG. 5 is a schematic diagram of an exemplary training process according to some embodiments of the present disclosure.

FIG. 5 is a schematic diagram of an exemplary training process 500 according to some embodiments of the present disclosure. The exemplary training process 500 uses information values as an example. As shown in FIG. 5, in step 501, based on original feature data, the information value corresponding to each feature can be calculated. In step 502, it can be determined whether the information values are greater than a preset information value threshold. In step 503, features having information values greater than the information value threshold can be extracted and added into an important feature set. In step 504, features having information values less than the information value threshold can be extracted and added into an auxiliary feature set. In step 505, a hashing operation can be performed on data in the auxiliary feature set to obtain hash values corresponding to the original auxiliary features, that is, obtaining hash features corresponding to the original auxiliary features. In step 506, the hash features obtained after the hashing operation can be combined with the features in the important feature set. The combined features can be used as feature fingerprints corresponding to the original features. In step 507, logistic regression training and prediction can then be performed on the feature fingerprints.

In this example, the feature data can be trained by using the foregoing highly efficient training method. For example, for 100 million features, assuming that K=200, B=12, and top 10000 important features are taken, a dimension reduction ratio is about 0.008292 after fingerprint features are generated. The features and data account can be reduced to less than 1% of the original volume. With the foregoing, for 100 million features, the AUC (area under the curve) can be improved by 2%, and the data size can be 1% of the original data volume.

Figure 6:
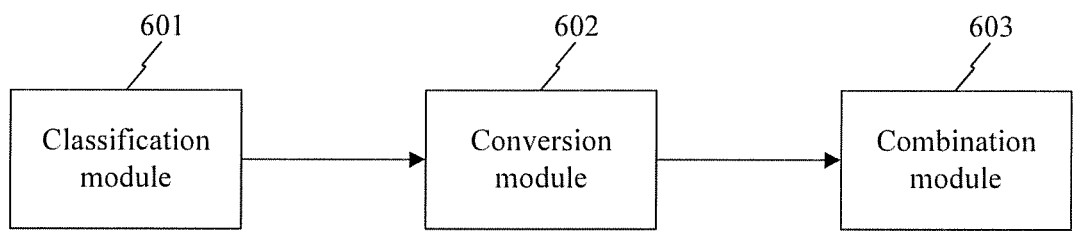
FIG. 6 is a schematic structural diagram of an exemplary feature data processing device according to some embodiments of the present disclosure.

According to some embodiments of the present disclosure, feature data processing devices are provided. As shown in FIG. 6, one exemplary feature data processing device 600 includes a classification module 601, a conversion module 602, and a combination module 603.

Classification module 601 can be configured to classify current features into an important feature set and an auxiliary feature set according to information attribute values of the features.

Conversion module 602 can be configured to convert the features in the auxiliary feature set to hash features.

Combination module 603 can be configured to combine the hash features with the features in the important feature set, and set the combined features as fingerprint features.

In some embodiments, the information attribute value can include at least one of information value and information gain of the feature. Classification module 601 can further include an acquisition sub-module, a setting sub-module, and a generation sub-module.

The acquisition sub-module can be configured to acquire information attribute values of the respective features.

The setting sub-module can be configured to set features having the information attribute values greater than or equal to a preset threshold as important features, and set features having the information attribute values less than the threshold as auxiliary features.

The generation sub-module can be configured to generate the important feature set according to the important features among the features and to generate the auxiliary feature set according to the auxiliary features among the features.

In some embodiments, conversion module 602 can convert the features in the auxiliary feature set to hash features by: converting, according to a preset hash algorithm, the auxiliary features to vectors including parameters corresponding to the preset hash algorithm.

In some embodiments, combination module 603 can further include a replacement sub-module, and a training sub-module.

The replacement sub-module can be configured to replace original features corresponding to to-be-processed data with the fingerprint features.

The training sub-module can be configured to perform training and prediction on the to-be-processed data based on the fingerprint features.

It is appreciated that one or more modules in the apparatus embodiments of the present disclosure can be integrated into one unit or can be configured separately. The above-described modules can be combined into one module or can be further divided into multiple sub-modules.

In view of the foregoing description, it should be appreciated that the present disclosure can be implemented by hardware, software, or by software plus a hardware platform. Based on such an understanding, the technical solutions of the present disclosure can be implemented in a form of a software product. The software product can be stored in a non-volatile storage medium (which can be a CD-ROM, a USB flash memory, a mobile hard disk, and the like). The storage medium can include a set of instructions for instructing a computer device (which may be a personal computer, a server, a network device, a mobile device, or the like) or a processor to perform a part of the steps of the methods provided in the embodiments of the present disclosure. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It is appreciated that the accompanying drawings are merely schematic diagrams of some exemplary embodiments. Some modules or processes illustrated in the accompanying drawings can be modified or omitted in some other embodiments of the present disclosure.

Those skilled in the art can appreciate that the modules described in the exemplary embodiments can be distributed according to the description of the implementation scenario provided herein and can also be modified to be located in one or more apparatuses, different from the implementation scenario described herein. The reference numbers used in the foregoing description and the accompanying drawings are merely used for description purposes, and do not represent priorities of the implementation scenarios, or mandatory sequence of the described processes or modules.

Described herein are merely some exemplary embodiments of the present disclosure. They are provided for description purposes only, to facilitate understanding of the present disclosure. Various modifications can be made by those skilled in the art consistent with present disclosure. Such modifications shall fall within the protection scope of the present disclosure.

The invention claimed is:

1. A feature data processing method, comprising:
classifying original features in training data into an important feature set and an auxiliary feature set according to information attribute values of the features;
converting features in the auxiliary feature set to hash features;
forming combined features by combining the hash features with features in the important feature set; and
setting the combined features as fingerprint features.

2. The method according to claim 1, wherein the information attribute value includes at least one of an information value and an information gain.

3. The method according to claim 1, wherein converting features in the auxiliary feature set to hash features comprises:
converting, according to a preset hash algorithm, the features in the auxiliary feature set to vectors comprising parameters corresponding to the preset hash algorithm.

4. The method according to claim 1, wherein after setting the combined features as fingerprint features, the method further comprises:
performing training and prediction on to-be-processed data based on the fingerprint features.

5. The method according to claim 1, wherein classifying original features in training data into the important feature set and the auxiliary feature set according to information attribute values of the features comprises:
acquiring information attribute values of the features;
setting features to be important features or auxiliary features based on comparisons between information attribute values of features and a threshold; and
generating the important feature set according to the important features, and generating the auxiliary feature set according to the auxiliary features.

6. The method according to claim 5, wherein setting features to be important features or auxiliary features based on comparisons between information attribute values of features and a threshold comprises:
determining a feature to be an important feature in response to an information attribute value of the feature being greater than or equal to the threshold; or
determining a feature to be an auxiliary feature in response to an information attribute value of the feature being less than the threshold.

7. A feature data processing device, comprising:
a memory storing a set of instructions; and
a processor configured to execute the set of instructions to cause the feature data processing device to perform:
classifying original features in training data into an important feature set and an auxiliary feature set according to information attribute values of the features;
converting features in the auxiliary feature set to hash features;
forming combined features by combining the hash features with features in the important feature set; and
setting the combined features as fingerprint features.

8. The feature data processing device according to claim 7, wherein the information attribute value includes at least one of an information value and an information gain.

9. The feature data processing device according to claim 7, wherein converting features in the auxiliary feature set to hash features comprises:
converting, according to a preset hash algorithm, the features in the auxiliary feature set to vectors comprising parameters corresponding to the preset hash algorithm.

10. The feature data processing device according to claim 7, wherein after setting the combined features as fingerprint features, the processor is further configured to execute the set of instructions to cause the feature data processing device to perform:
performing training and prediction on to-be-processed data based on the fingerprint features.

11. The feature data processing device according to claim 7, wherein classifying original features in training data the important feature set and the auxiliary feature set according to information attribute values of the features comprises:

acquiring information attribute values of the features;

setting features to be important features or auxiliary features based on comparisons between information attribute values of features and a threshold; and generating the important feature set according to the important features, and generating the auxiliary feature set according to the auxiliary features.

12. The feature data processing device according to claim 11, wherein setting features to be important features or auxiliary features based on comparisons between information attribute values of features and a threshold comprises:

determining a feature to be an important feature if an information attribute value of the feature is greater than or equal to the threshold; and determining a feature to be an auxiliary feature if an information attribute value of the feature is less than the threshold.

13. A non-transitory computer readable medium that stores a set of instructions that is executable by at least one processor of a computer to cause the computer to perform a feature data processing method, comprising:

classifying original features in training data into an important feature set and an auxiliary feature set according to information attribute values of the features;

converting features in the auxiliary feature set to hash features;

forming combined features by combining the hash features with features in the important feature set; and setting the combined features as fingerprint features.

14. The non-transitory computer readable medium according to claim 13, wherein the information attribute value includes at least one of an information value and an information gam.

15. The non-transitory computer readable medium according to claim 13, wherein converting features in the auxiliary feature set to hash features comprises:

converting, according to a preset hash algorithm, the features in the auxiliary feature set to vectors comprising parameters corresponding to the preset hash algorithm.

16. The non-transitory computer readable medium according to claim 13, wherein after setting the combined features as fingerprint features, the set of instructions that is executable by the at least one processor of the computer causes the computer to further perform:

performing training and prediction on to-be-processed data based on the fingerprint features.

17. The non-transitory computer readable medium according to claim 13, wherein classifying original features in training data into the important feature set and the auxiliary feature set according to information attribute values of the features comprises:

acquiring information attribute values of the features;

setting features to be important features or auxiliary features based on comparisons between information attribute values of features and a threshold; and generating the important feature set according to the important features, and generating the auxiliary feature set according to the auxiliary features.

18. The non-transitory computer readable medium according to claim 17, wherein setting features to be important features or auxiliary features based on comparisons between information attribute values of features and a threshold comprises:

determining a feature to be an important feature if an information attribute value of the feature is greater than or equal to the threshold; and determining a feature to be an auxiliary feature if an information attribute value of the feature is less than the threshold.

\* \* \* \* \*